United States Patent [19]

Weber et al.

[11] 4,417,630

[45] Nov. 29, 1983

[54] METHOD AND APPARATUS FOR CHECKING THE WEIGHT OF CONSIGNMENTS ASSEMBLED IN CONTAINERS

[76] Inventors: Otto Weber, Kurpfalzstr. 21, D-6945 Hirschberg; Klaus Ohnsmann, Leharstr. 32, D-6040 Weinheim; Ferdinand Christ, Heidelberger Str. 7, D-6831 Brühl, all of Fed. Rep. of Germany

[21] Appl. No.: 307,505

[22] Filed: Oct. 1, 1981

[30] Foreign Application Priority Data

Nov. 14, 1980 [DE] Fed. Rep. of Germany ....... 3042902

[51] Int. Cl.³ .................... G01G 19/52; G01G 13/14; G06K 9/00
[52] U.S. Cl. .......................................... 177/1; 177/50; 177/165; 382/1
[58] Field of Search ................... 177/1, 165, 50, 163; 340/146.3 K; 198/502

[56] References Cited

U.S. PATENT DOCUMENTS

| 3,750,158 | 7/1973 | Anastassakis | 177/50 X |
| 3,912,047 | 10/1975 | Chun et al. | 177/50 X |
| 4,193,540 | 3/1980 | Dougados et al. | 340/146.3 K |
| 4,231,439 | 11/1980 | Hall, Jr. et al. | 177/50 X |
| 4,274,499 | 6/1981 | Grimminger et al. | 177/50 X |
| 4,344,520 | 8/1982 | Czoch et al. | 198/502 X |

Primary Examiner—George H. Miller, Jr.
Attorney, Agent, or Firm—Edward D. Gilhooly

[57] ABSTRACT

The invention describes a method for checking the weight of consignments assembled in containers, where the net weight of a container is measured during the passage and transmitted to a consignment computer, the weight of the container filled with the articles of this consignment is also measured in the passage and transmitted to the computer, which ascertains the difference of the two weights as the actual weight of the consignment and compares it against the fed-in nominal weight of the consignment in question, whereupon in case of a deviation of the actual weight from the nominal weight above a predetermined tolerance boundary the container in question is sorted out.

2 Claims, 3 Drawing Figures

METHOD AND APPARATUS FOR CHECKING THE WEIGHT OF CONSIGNMENTS ASSEMBLED IN CONTAINERS

The invention relates to a method and an apparatus for checking the weight of consignments assembled in containers.

PRIOR ART

Prior art checking methods have been restricted to random sampling. German Offenlegungsschrift No. 2,638,214 describes a weighing device by which weighing is possible during the course of a passage. The articles to be weighed arrive via a slope in the field of two pulse generators, which are provided above the weighing device in the second portion thereof. As soon as the article to be weighed arrives within the field of the first pulse generator, a pulse is triggered and the weighing process is initiated. The weight of the consignments assembled in containers is not to be checked by this method.

SUMMARY OF THE INVENTION

The invention is based on the problem of providing a method for checking the weight of consignments assembled in containers by which each consignment assembled can be checked, independently from the weight of the respective consignment, as to whether or not the consignment was correctly assembled. That is that each consignment, or each container, respectively, can be checked during the course of the passage, that means without having to retard or to stop the containers, which are constantly conveyed.

The claimed method according to the invention is characterized in that the net weight of a container is measured during the passage and transmitted to a consignment computer, the weight of the container filled with the articles of this consignment is also measured in the passage and is transmitted to the computer, which ascertaines the difference of the two weights as the actual weight of the consignment and compares it against the fed-in nominal weight of the consignment in question, whereupon in case of a deviation of the actual weight from the nominal weight above a predetermined tolerance boundary the container in question is sorted out and the other containers are conveyed on.

It is preferred if a recognition code assigned to and supplied to each of the containers is read during the weighing process and transmitted to the computer and if the two weighing devices constantly measure the weight and transmit the measured weight to the consignment computer as soon as the balancing process of the weighing device has come to a standstill, which computer assignes, via the recognition code supplied to it, the nominal weight and the actual weight of the same container to each other and thus performs for each container the nominal to actual weight comparison.

The weighing devices are therefore continuously switched on, at least as soon as a container arrives on the weighbridge of the weighing device. The electromechanically effected balancing process for the weighing device is thus initiated as soon as the respective container together with its consignment arrives on the weighbridge of this weighing device. As soon as this balancing process has come to a standstill, a pulse is transmitted by the pulse generator to the computer, which performs the nominal to actual value comparison. In this operation, the computer has to compare the nominal weight fed in against the actual weight measured. To make sure that the computer need not take into consideration the weight of the container but has to consider only the weight of the respective consignment, i.e. without the container, the empty weight of the container is measured beforehand, which weight may vary within certain limits for example because of scrap portions or the like in it from one container to the other. By means of the coding of the container, the computer can correctly assign the latter during the course of the computing operations mentioned such that the nominal to actual weight comparison is always effected for one and the same container.

In case of lower requirements with respect to the measuring accuracy and particularly in cases when one can be rather sure that the empty weights are all practically identical, measuring of the empty weights of the containers may be neglected. In this case it is only the weight of the container filled with the respective consignment which is measured as the actual weight and is compared against the nominal weight of the container. The nominal weight is transmitted, in both cases, to the computer in connection with the consignment order via which the computer calculates the nominal weight.

The method applied in the weighing process according to German Offenlegungsschrift No. 2,638,214 as mentioned cannot be applied in the case of the present invention, especially because it is the pulse generator which in that case initiates the weighing process. Neither has a computer been provided in the former case to which the weight as measured is transmitted. This means that in the prior art method the time required by the container from arriving at the weighing device until the pulse generator is reached is not used. In the case of the present invention, this time is employed for the balancing process of the weighing device so that the method according to the invention is characterized by a surprisingly high passage speed. Experiments have shown that in a common consignment assembling plant for pharmazeutical articles, the weights of the consignments assembled in the containers may be checked while the normal transport speed of the containers in the plant need not be reduced.

While in the case of the weighing process according to the German Offenlegungsschrift as mentioned it may be checked only whether or not one and the same article of one series shows a weight within a certain tolerance boundary, it is possible in accordance with the method of the present invention to measure weights within any band width and thus to check whether or not the consignment assembled has its nominal weight.

The weighing devices used for this purpose commonly measure the weights in a number of successive measuring steps. The measuring time is furtheron shortened in such a weighing device if the weight to be expected is transmitted to the computer, which prior to the weighing process transmits to the weighing device the measuring step to be expected and depending from this weight preadjusts the weighing device to this measuring step.

A weighing device, which is particularly suitable for measuring during the passage as aimed at is characterized in accordance with the invention in that on the weighbridge of the weighing device a driven conveyor belt is provided above which at least one pulse generator is provided, which is connected, via a signal line, to the computer.

In the direction of transport of the conveyor belt two pulse generators may be provided one after the other the mean value of the measuring values of which are obtained. By this, the measuring accuracy is furtheron increased. In most cases of application however a single pulse generator is sufficient, which should be provided at a location where, in all the cases of all possible weights, the balancing process of the weighing device has commonly come to a standstill.

It is preferred if an optically readable code is provided at the outer wall of the containers. The pulse generator may then be provided as a light barrier which is arranged at the same level with reflecting foils provided on the containers. This has already been known through German Utility Model No. 7,912,638, its disclosure being incorporated by reference.

The invention will now be described in more detail based on exemplified embodiments, from which further important features may be taken.

Figure 1:
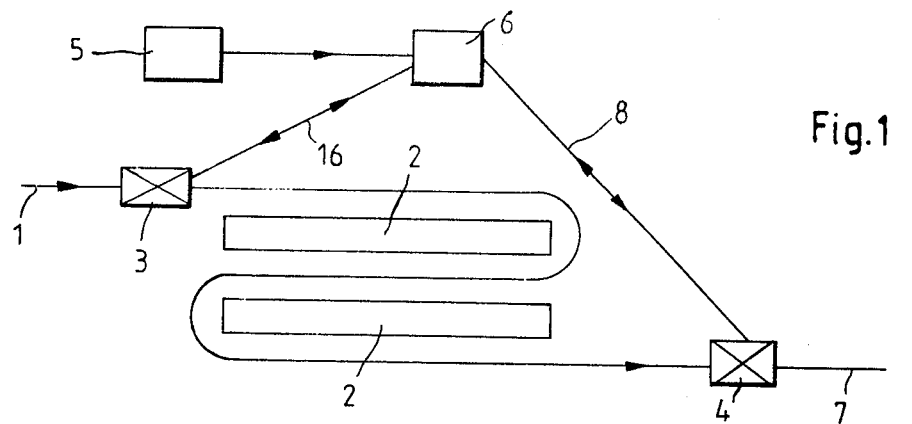
FIG. 1 shows a schematic view of a store to explain the consignment assembling process and the weighing of the assembled articles as in accordance with the invention.

To start with, the basic assembling process will be explained based on FIG. 1. Before the introduction of the new process, all the articles of the consignment had accurately to be weighed. The weighing results were punched and stored in a computer 6.

When the consignment voucher is made up, the weight sum of each order is ascertained, is stored and additionally printed onto the voucher.

Assembling of the articles according to the invention is performed as follows. At the entrance 1 of a transport path, containers 13 (compare FIG. 2) are put onto a conveyor belt and are transported in the direction of the arrow through the store the shelves of which are indicated by the numeral 2. At the entrance to the store, in the transport flow, a first weighing device 3 is provided at a position where containers loaded with the consignment are weighed and at the exit, also in the transport flow, a second weighing device 4 is provided.

Orders to be executed are accepted at an order station 5 and transmitted to a central computer 6, which inter alia performs also a target control weight the articles comprising each separate consignment to be assembled dependent on the number of different orders being filled. The computer knows therefore the appropriate target weight of the articles in each of the containers at the exit 7 of the store dependent on the particular consignment being loaded. This is the so-called nominal weight.

The two weighing devices 3 and 4 serve to ascertain the actual weight of each consignment. Weighing device 3 provided at the entrance to the store measures the empty weight of the container and transmits this empty weight, via a line 16, to computer 6. This will later be explained in more detail in connection with FIGS. 2 and 3. Subsequently, the container is passed along shelves 2 and the particular articles of the specified consignment are assembled in accordance with the order, i.e. the container is filled with the corresponding articles. Subsequently, the filled container is again measured by weighing device 4 at the exit located beyond the loading station and this total weight is transmitted, via a line 8, to computer 6.

The computer therefore knows not only the nominal weight (via input 5) intended for each different consignment, but also the actual weight of the respective consignment, which is ascertained by forming the difference of the total weight (weighing device 4) minus the empty weight (weighing device 3). The computer compares the nominal weight against the actual weight. If the two weights agree, within a given tolerance boundary, it is obvious that the order has correctly been assembled and the respective container may be dispatched. If the computer determines a deviation of the nominal weight from the actual weight, the corresponding container is sorted out and its consignment is checked or assembled again.

In certain cases, weighing device 3 and line 16 can be left out, particularly in such cases when the empty weights of the containers to be considered for checking purposes are all identical.

Figure 2:
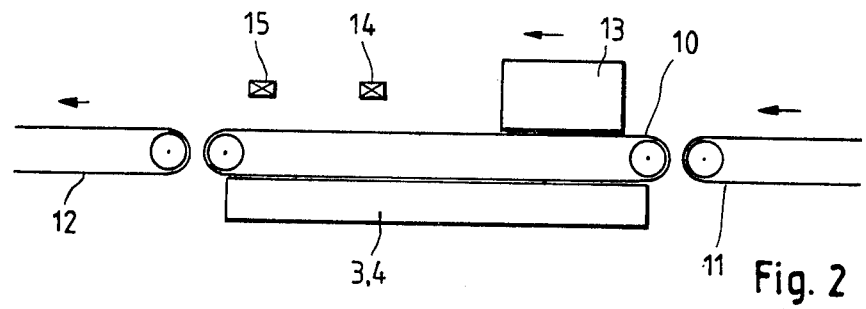
FIG. 2 shows a schematic lateral view of the weighing devices employed.
Figure 3:
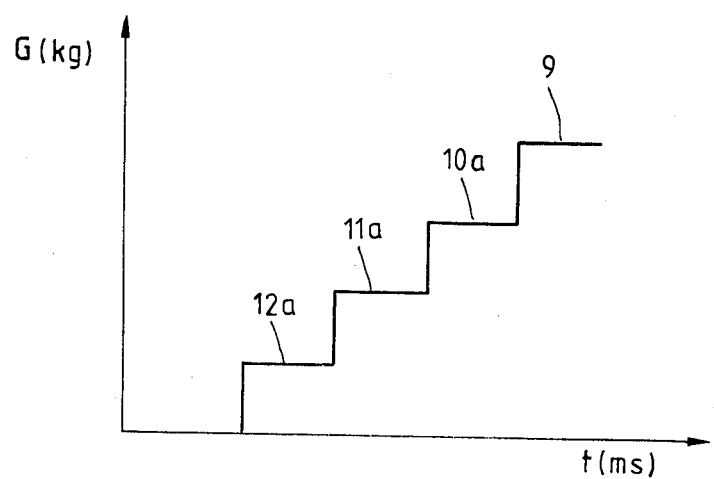
FIG. 3 shows a diagram to explain the measuring steps of such a weighing device where the weight is plotted against the measuring time.

FIG. 2 shows the weighing process at both weighing devices 3, and 4. On the weighing device, a conveyor belt 10 is provided, which is driven in the direction of the arrow. In front of, and behind, this conveyor belt, there are further conveyor belts 11 and 12, respectively, which shows that weighing device 3, and 4, respectively, are within a transport flow path. Box shaped container 13 arrives at the edge of the weighbridge at conveyor 10, as shown in FIG. 2. The weighing device is constantly switched on and now initiates the weighing process. As the weight of container 13 (not including the articles at device 3 and with the articles at device 4) grows with the advance of the container on the weighbridge, the weight measured by the weighing device passes measuring steps 12a, 11a, 10a and 9, as shown in FIG. 3.

Above conveyor belt 10 and at the level of the containers 13 passed on it, at least one pulse generator 14, 15 is provided at such a location that the lines 8, 16 connecting weight devices 3, 4 to the computer are opened for transfer of the weight. At the outer wall of container 13 a code is provided, which is read in a standard way by pulse generator 14, 15 as soon as the container with its code passes the pulse generator. The container weight detected by weighing device 2, 3 and together with it, the corresponding order, identified and the weight data are transmitted via line 8, or 16, respectively, to computer 6. Identification of the container may however also be brought about by another reading device, which for instance may be provided at a short distance before or behind weighing device 3, or 4, respectively.

The pulse generator 14, and if necessary, 15, provides that the balanced-in weight now measured by weighing device 3, or 4, is transmitted, via line 8, or 16, respectively, to computer 6. The latter stores the weight if it is the tare weight of weighing device 3 or it performs the nominal to actual value comparison.

Container 13 has now arrived on conveyor belt 12 and then either passes on to a dispatching station or is sorted out if the nominal to actual value comparison has shown that the respective consignment has not correctly been assembled.

FIG. 3 explains the balancing process of the weighing device and shows also that most different weights may be measured. This is effected by making use of the fact that computer 6 was beforehand fed, via input 5, the weight to be expected at the exit. This weight is now transmitted, via line 8, to weighing device 4 at the exit, which may therefore be preadjusted to the respective weight step prior to the arrival of the respective container on weighing device 4.

Such a process is, on principle, also possible at the weighing device 3 at the entrance, but here is unnecessary as the empty containers vary in weight only within relatively small limits. The weighing device 3 at the entrance may therefore, either via line 16 or directly, be preadjusted to the normal empty weight of one of containers 13.

The pulse generators 14, 15 are provided in about the last third of conveyor belt 10.

In the experiments, a weighing device of the type KOM RB supplied by August Sauter GmbH, Albstadt, West Germany, was used. This weighing device operates without weighing stroke. As the computer 6, the type EPS 1100 device supplied by Krupp Atlas Electronic, Bremen, West Germany, was employed.

Experiments have shown that for weighing articles up to a total weight of 60 kilograms, a length of the conveyor belt 10 of one meter is sufficient while the belt velocity was so selected that this meter was passed within a period of two seconds. Within these two seconds, the articles could accurately be weighed with an accuracy of plus or minus 5 grams, which constitutes a sufficient weighing accuracy for most applications particularly if the weighing device is employed as a checking device for the correct assembling of consignments where the articles in the container are counted by the total weight.

In the foregoing it was assumed that weighing device 3, 4 operates without weighing stroke. It is however also possible to employ weighing devices operating with a weighing stroke if care is taken that the object to be weighed is transported onto the weighbridge at about the same level as the latter. This may for instance be accomplished in that the last portion of the previous conveyor belt 11, and if necessary also the first portion of the subsequent conveyor belt 12, are downwardly elastic so that the containers 13 arriving at this location reach this place at about the level of the weighbridge of the respective weighing device. As a whole, it may be stated that in the implementation of the invention, any sufficiently accurate weighing device may be employed.

Preferably, the weighing device receives, after a determined period of time, a pulse from computer 6, which pulse will tare the weighing device again, i.e. return it again to the zero position. By this, it is assured that any variations of the weight of the conveyor belt, for instance by dirt sticking to it or the like, are compensated for. Such a taring impulse will be emitted to the weighing device in intervals of a few minutes, if necessary also after each weighing operation.

The length of the conveyor belt 10 and the conveyor belt speed are so linked relative to each other that the weighing device should have sufficient time to measure the respective weight. The higher the conveying speed of the belt, the longer the belt has to be selected, or vice versa, respectively.

Within the limits determined by practice, any weights may be measured by the present invention. This results from the fact that for instance consignments of most different articles on containers 13 have to be weighed. In the prior art, weights identical within predetermined boundaries were measured.

We claim:

1. A method for checking the weight of consignments assembled in containers, comprising the steps of measuring the net weight of an empty container being introduced for passage on a conveyor belt and transmitting the weight to a consignment computer, measuring the weight of said container filled with the articles of the consignment during passage and transmitting the weight to said computer, determining the difference of said two weights as the actual weight of the consignment and comparing the actual weight against the fed-in normal weight of the consignment in question, whereupon in case of a deviation of said actual weight from said nominal weight above a predetermined tolerance boundary the container in question is sorted out and the other containers are conveyed on, reading a recognition code associated with each of said containers during the weighing process and transmitting said code to said computer, transmitting said measured weights to said consignment computer as soon as the empty and filled weights are determined, comparing said empty weight with said filled weight of the same container to each other in relation to a recognition code, and determining the proper comparison of the weights.

2. An apparatus for checking the weight of consignments assembled in containers, comprising a weighbridge of a weighing device, coupled to a driven conveyor belt, said weighbridge arranged to weigh the containers moving on said driven conveyor, a pulse generator mounted adjacent said driven conveyor, said at least one pulse generator being connected to a computer and weighbridge by a signal line and being arranged to transmit the values measured by said weighbridge to said computer in response to the passage of the container.

* * * * *